United States Patent [19]

Kobayashi

[11] Patent Number: 4,848,157

[45] Date of Patent: Jul. 18, 1989

[54] ACCELERATION DETECTING DEVICE

[75] Inventor: Toshihiro Kobayashi, Nagoya, Japan

[73] Assignee: Aisin Seiki Kabushiki Kaisha, Kariya, Japan

[21] Appl. No.: 122,682

[22] Filed: Nov. 18, 1987

[30] Foreign Application Priority Data

Nov. 20, 1986 [JP] Japan .............................. 61-277377
Sep. 30, 1987 [JP] Japan .............................. 62-246691

[51] Int. Cl.⁴ ............................................ G01P 15/12
[52] U.S. Cl. ..................................... 73/517 R; 338/5
[58] Field of Search ................ 73/517 R, 862.65, 514; 338/2, 5, 43, 47

[56] References Cited

U.S. PATENT DOCUMENTS

| 4,483,194 | 11/1984 | Rudolf ............................. 73/517 R |
| 4,565,255 | 1/1986 | Sarrazin ........................... 73/862.66 |
| 4,567,771 | 2/1986 | Nelson et al. .................... 73/517 R |
| 4,579,007 | 4/1986 | Flassayer ......................... 338/2 |

FOREIGN PATENT DOCUMENTS

| 522411 | 4/1955 | Italy .................................. 73/517 R |
| 61-144576 | 7/1986 | Japan ................................ 73/517 R |
| 534694 | 1/1977 | U.S.S.R. ........................... 73/517 R |
| 1534276 | 11/1978 | United Kingdom ................... 338/5 |
| 2183040 | 5/1987 | United Kingdom ............. 73/517 R |

Primary Examiner—John Chapman
Attorney, Agent, or Firm—Oblon, Fisher, Spivak, McClelland & Maier

[57] ABSTRACT

An acceleration detecting device which detects an acceleration and/or deceleration. The acceleration detecting device comprises a beam, supporting member supporting both ends of the beam, a weight for twisting the beam in response to an applied acceleration substantially provided at the center of said beam, and, a detector for detecting the amount of the twisting deformation of said beam. When the acceleration is applied to the detecting device, the beam is bent and deformed in proportion to level of the acceleration. The deformation of the beam is detected by the detector, and the signal according to the level of the acceleration is output from the detecter.

8 Claims, 6 Drawing Sheets

ACCELERATION DETECTING DEVICE

BACKGROUND OF THE INVENTION

1. Field of the Invention

This invention relates generally to an acceleration detecting device which detects acceleration or deceleration and more particularly to an acceleration detecting device with a beam supported at both ends.

2. Description of the Prior Art

The acceleration detecting device shown in FIG. 17 is well known in the prior art. This detecting device comprises a beam 1 whose one end is supported by a plinth 3 and whose other end is free, with strain gauges 2 provided on the beam 1.

When an acceleration is applied to this detecting device, the free end of the beam 1 is displaced, and a bend is generated on the beam 1. Then the bend generated on the beam 1 is converted into an electric signal by the strain gauges 2.

Meanwhile, the bend generated on the beam 1 is directly proportional to the acceleration. Accordingly, the electric signal converted by the strain gauges 2 becomes directly proporational to the acceleration.

Such a detecting device is suggested in many applications, for example Japanese patent publication No. 139758/1986 published on June 27, 1986. The Japanese patent publication No. 139758/1986 shows a semiconductor detecting device with a silicon beam and strain gauges 2 made of piezo-electric resistors.

In the above mentioned detecting device, the beam 1 has to be bent greatly by a small acceleration in order to detect a small acceleration.

It is possible to amplify the electric signal converted by the strain gauges 2 in order to detect an acceleration with a smmaller level. However, it is preferable not to amplify the electric signal from the detecting device, because not only the necessary electric signal but also noises are amplified at the same time.

Weakening the mechanical strength of the beam 1, for example by thinning the beam 1 or by increasing the mass of the free end of the beam 1 by fixing a weight to the free end etc., is required in order to bend the beam 1 greatly by an acceleration with a smaller level.

However, if the mechanical strength of the beam 1 is weakened, an accurate detection could not always be obtained after applying an excessive acceleration. Because, the detecting parameters might be changed by breakage or by plastic deformation of the beam 1 etc.

SUMMARY OF THE INVENTION

Accordingly, the present invention provides a new and improved acceleration detecting device which obviates the above mentioned drawbacks associated with conventional acceleration detecting devices.

It is also an object of the present invention to detect an acceleration with a small level.

It is also an object of the present invention to prevent the acceleration detecting parameters from changing after applying an excessive acceleration.

It is a further object of the present invention to output an accurate electric signal with small error.

To achieve the above objects, the present invention comprises a beam, means for supporting both ends of the beam, means for twisting the beam in response to the applied acceleration substantially provided on the center of the beam, and means for detecting the amount of the twisting deformation of the beam.

Other features and advantages of the present invention will become apparent from the following description and the accompanying drawings.

DETAILED DESCRIPTION OF THE PREFERRED EMBODIMENT

Figure 1:
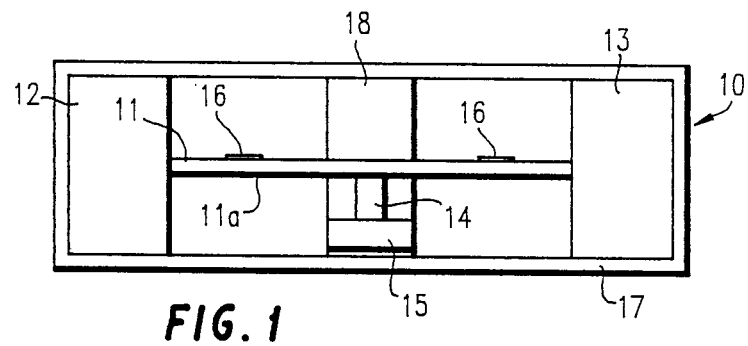
FIG. 1 cross sectional view along line I—I of FIG. 16 showing the first embodiment of the present invention.
Figure 2:
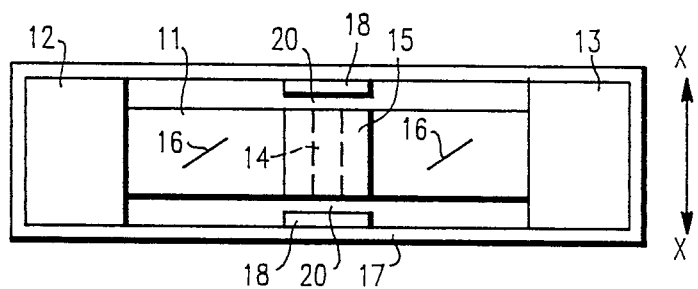
FIG. 2 cross sectional view along line II—II of FIG. 16 showing the first embodiment of the present invention.
Figure 16:
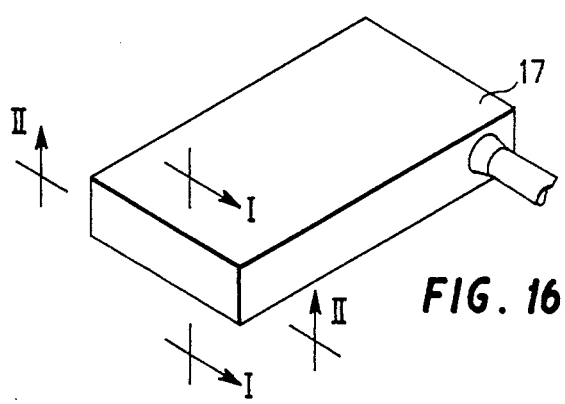
FIG. 16 is a oblique view showing the external appearance of the acceleration detecting device of the present invention.
Figure 17:
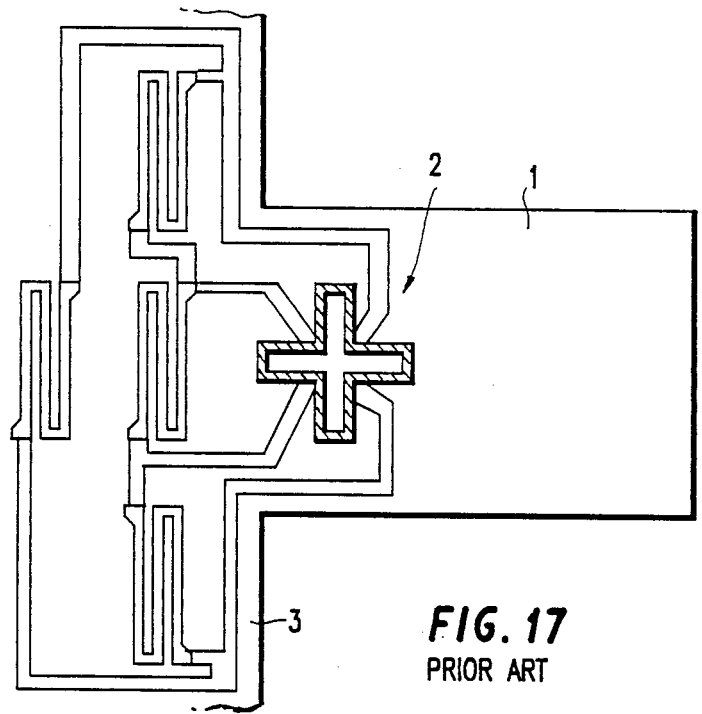
FIG. 17 is a plane view of the prior art acceleration detecting device.

FIGS. 1, 2 and 16 show the first embodiment of the present invention. As shown in FIG. 16, the detecting device according to the first embodiment is installed in the case 17. As shown in FIGS. 1 and 2, the detecting device of the first embodiment comprises a beam 11, two plinthes 12 and 13 for supporting both ends of the beam 11, a weight 15 for twisting the beam 11 in response to an applied acceleration substantially provided on the center of the beam 11, and, two strain gauges 16 for detecting the amount of the twisting of the beam 11.

Both ends of the beam 11 are supported by the two plinthes 12 and 13 respectively. The projection member 14 is fixed to the beam 11 at the center of the beam 11. This projection member 14 is projected perpendicularly against one side 11a of the beam 11. Then the weight 15 is fixed at one end of the projection member 14.

On the other hand, two strain gauges 16 are provided on both sides of the weight 15. The two strain gauges 16 are attached to the beam 11 in order to detect the certain strain in the direction of 45° from the longitudinal direction of the beam 11. These gauges 16 are connected to the signal processing circuit 21 by conductive wires (not shown).

The beam 11 and plinthes 12 and 13 are installed in the case 17. The two stoppers 18 are fixed to the inside of the case 17 to prevent excessive movement of the weight 15. There are two spaces 20 between the stoppers 18 and the weight 15. It is also preferable to establish the size of the spaces 20 according to the mechanical strength of the beam 11, but, in this embodiment, the size of the spaces 20 are established according to the permitted quantity of the errors.

Figure 3:
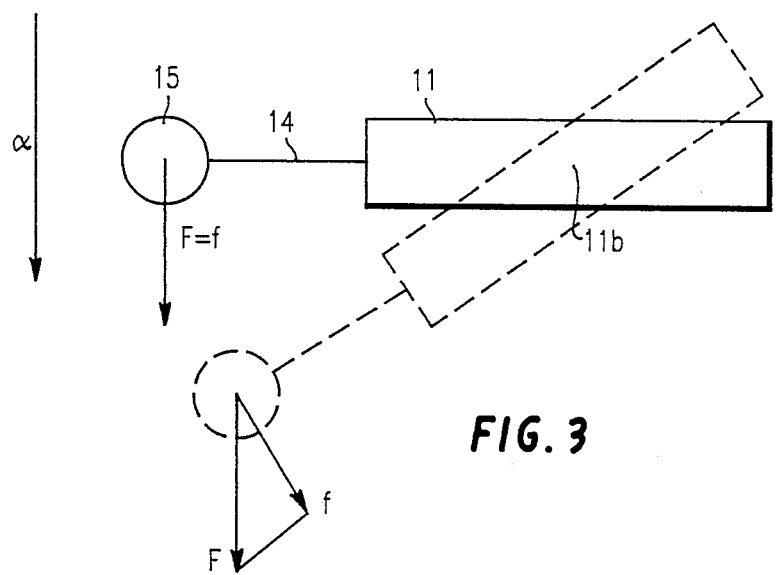
FIG. 3 is a cross sectional view explaining how the error is caused.

Referring now to FIG. 3, the reason why the errors are generated is explained. The force F is directional proportional to the acceleration and is generated when the acceleration α is applied to the detecting device 10. At this time, the weight 15 is rotated around the longitudinal axis 11b of the beam 11 by the twisting deformation of the beam 11.

If the force F generated by acceleration is constant, the stress f related to the twisting deformation is decreased when the weight 15 rotates. Accordingly, the larger the twisting deformation becomes, i.e. the larger the applied acceleration becomes, and the larger the errors become. Therefore, the size of the spaces 20 are established according to the permitted quantity of the errors in the first embodiment.

Referring now to FIGS. 1 and 2 again, the operation of the detecting device 10 is explained.

The force is directly proportional to the acceleration and is generated by the weight 15 when the acceleration is applied to the X—X direction of the detecting device 10 shown in FIG. 2. The force generated by the weight 15 makes the beam 11 twist and generates the twisting deformation in direct proportion to the acceleration.

At this stage, the twisting deformation generated on the beam 11 is distributed equally along the longitudinal direction of the beam 11. When the twisting deformation is generated on the beam 11, a strain in proportion to the amount of the deformation is generated on the beam 11.

The amount of the strain on the beam 11 is converted to the electric signal by the strain gauges 16.

The detecting device according to the first embodiment detects the acceleration by using the twisting deformation of the beam 11. Both the compressive strain and expansive strain are generated on the beam 11 toward directions intersecting at right angles with respect to each other, when the twisting deformation of the beam 11 is generated. The generated compressive and expansive strains occur at 45° from the longitudinal direction of the beam 11 respectively. Accordingly, if a single strain gauge 16 is attached to the beam 11 at the same direction of 45° from the longitudinal direction of the beam 11, one of the compressive and expansive strains should be converted into the electric signal.

Further, in the first embodiment, the twisting deformation is generated symmetrically with respect to the weight 15 on the beam 11, because the weight 15 is fixed to the center of the beam 11.

Therefore, the detecting device according to the first embodiment is suitable for using a Wheatstone bridge circuit because of the two strain gauges 16 that are attached at both sides of the weight 15, in parallel each other, and at the direction of 45° from the longitudinal direction of the beam 11. This is because the compressive strain is detected by one of the strain gauges 16 and the expansive strain is detected by the other strain gauge 16.

Figure 4:
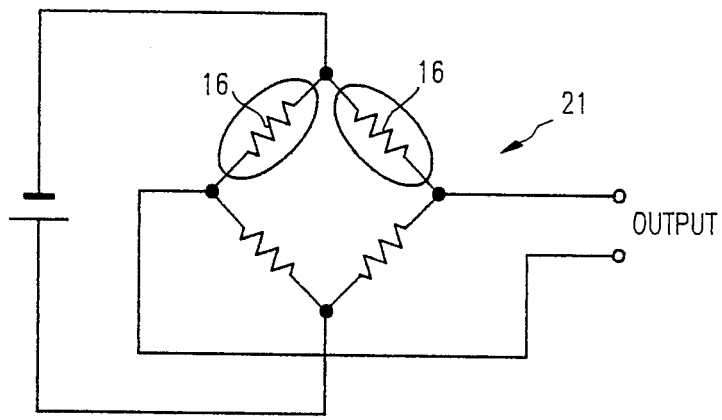
FIG. 4 is a circuit diagram showing the signal processing circuit for the first embodiment of the present invention.

Referring now to FIG. 4, the signal processing circuit 21 of the first embodiment is explained. A detailed explanation of the Wheatstone bridge circuit operation is omitted from this specification, because the Wheatstone bridge circuit is well known. The detecting device 10 using the Wheatstone bridge circuit offsets errors in the strain gauges 16 generated by temperature variations etc. and thus more accurately measures accelerations with small levels.

Further, in the first embodiment, the generated strain is equally distributed along the total length of the beam 11, because the twisting deformation is distributed equally along the longitudinal direction of the beam 11. Accordingly, if the location of the strain gauges 16 is varied, the acceleration detecting parameters should not be varied when the strain gauges 16 are attached in parallel to each other and at a direction of 45° from the longitudinal direction of the beam 11. Therefore, the first embodiment of this device is suitable for mass-production manufacturing of the detecting device with equalized detecting parameters.

Figure 5:
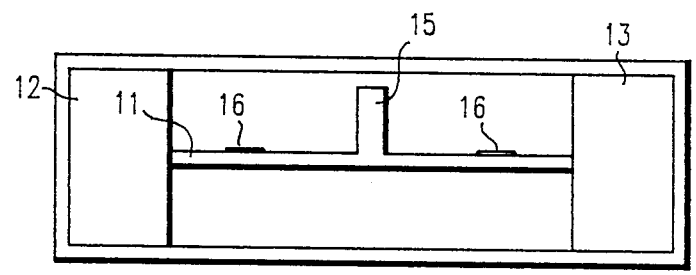
FIG. 5 cross sectional view along line I—I of FIG. 16 showing the second embodiment of the present invention.
Figure 6:
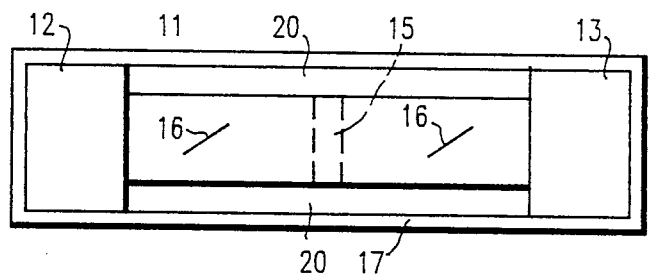
FIG. 6 cross sectional view along line II—II of FIG. 16 showing the second embodiment of the present invention.

Referring to FIGS. 5 and 6, the second embodiment of the present invention is explained. The projection member 14 of the first embodiment is omitted, and the weight 15 is fixed to the beam 11 directly in the second embodiment. Further, the stoppers 18 of the first embodiment are omitted, and the spaces 20 are provided between the weight 15 and case 17 in the second embodiment. The size of the spaces 20 is established according to the permitted quantity of the errors as in the first embodiment. The construction of the remaining elements of the detecting device 10 according to the second embodiment is the same as the first embodiment. Therefore, a further detailed explanation about the second embodiment is unnecessary.

Figure 7:
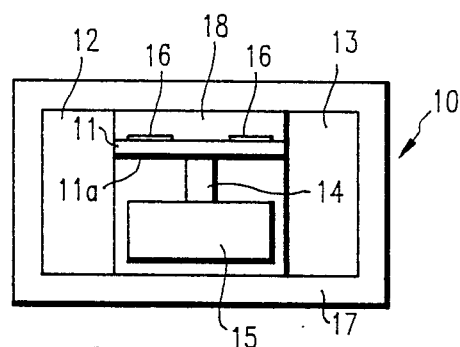
FIG. 7 cross sectional view along line I—I of FIG. 16 showing the third embodiment of the present invention.
Figure 8:
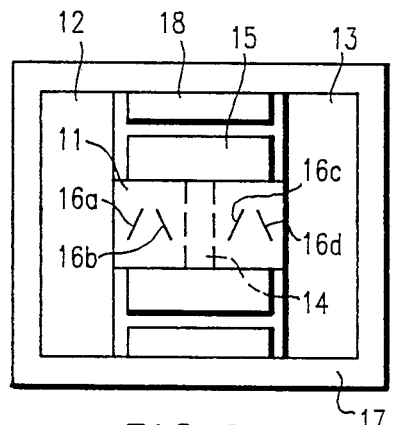
FIG. 8 cross sectional view along line II—II of FIG. 16 showing the third embodiment of the present invention.
Figure 9:
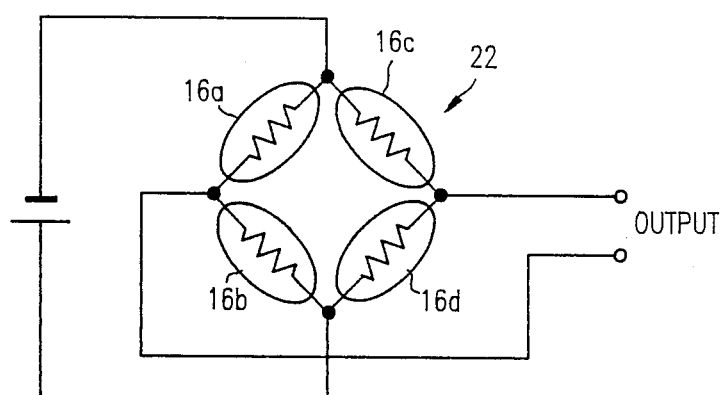
FIG. 9 is a circuit diagram showing the signal processing circuit for the third embodiment of the present invention.

Referring now to FIGS. 7, 8 and 9, the third embodiment of the present invention is explained. The detecting device of the third embodiment uses four strain gauges 16a, 16b, 16c and 16d instead of the two strain gauges 16 of the first embodiment.

The four strain gauges 16a–16d are provided as follows. The strain gauges 16a and 16c are attached to one surface of the beam 11 on both sides of the weight 15, in parallel to each other and in the direction of +45° from the longitudinal direction of the beam 11. And also, the strain gauges 16b and 16d are attached to one surface of the beam 11, on both sides of the weight 15, in parallel to each other and in the direction of −45° from the longitudinal direction of the beam 11. Then the four strain gauges 16a–16d are connected to the signal processing circuit 22 by conductive wires (not shown).

The detailed explanation of the signal processing circuit 22 is omitted because the Wheatstone bridge circuit is well known in the art. The processing circuit 22 with four strain gauges 16a–16d offsets the changes of the acceleration detecting parameters of the strain gauges 16a–16d generated by the temperature variation etc., and more accurately measures accelerations with small levels.

The construction of the remaining elements of the third embodiment is the same as the first embodiment. Therefore, a further detailed explanation of the third embodiment is omitted.

Figure 10:
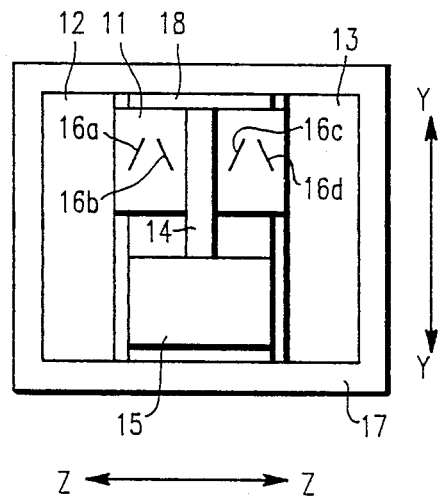
FIG. 10 cross sectional view along line I—I of FIG. 16 showing the fourth embodiment of the present invention.
Figure 11:
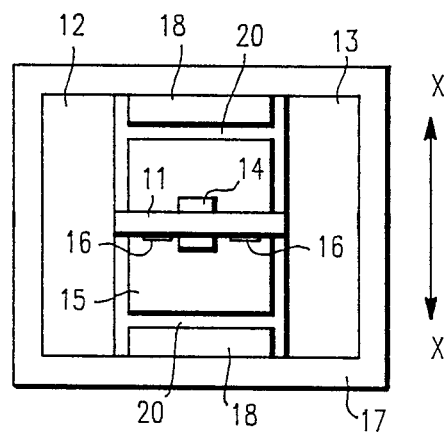
FIG. 11 cross sectional view along line II—II of FIG. 16 showing the fourth embodiment of the present invention.

Referring now to FIGS. 10 and 11, the fourth embodiment of the present invention is explained. The beam 11 of the fourth embodiment is rotated 90° around the longitudinal axis 11b from the position of the beam 11 according to the third embodiment. Accordingly, the position of the weight 15 against the beam 11 is different from the third embodiment.

In the fourth embodiment, the weight 15 projects in a direction in which the beam 11 is difficult to bend. Therefore, the amount of the bending deformation of the beam 11 is small for an acceleration in the Y—Y direction and Z—Z directions shown in FIG. 10.

Accordingly, the detecting device 10 of the fourth embodiment has a sharp directivity. Therefore, only an acceleration in the X—X direction is detected by the detecting device 10 according to the fourth embodiment. And also, the detecting device 10 according to the fourth embodiment has a high endurance with respect to excessive acceleration in the Y—Y direction or the Z—Z direction.

The other construction of the fourth embodiment is the same as in the third embodiment. Therefore a further detailed explanation of the fourth embodiment is omitted.

Figure 12:
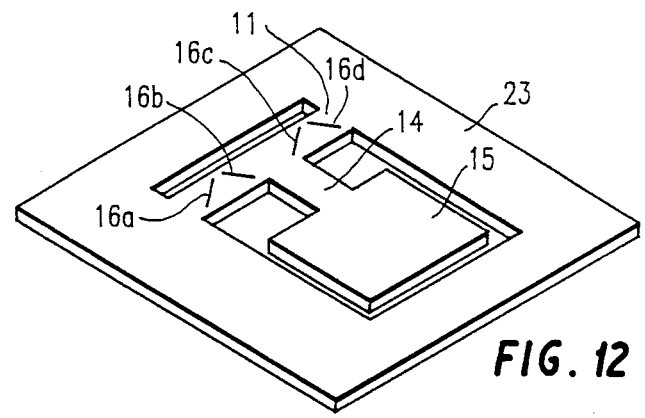
FIG. 12 is an oblique view showing the fifth embodiment of the present invention.

Referring now to FIG. 12, the fifth embodiment of the present invention is explained. The fifth embodiment is one example of a simplification the fourth embodiment. In the fifth embodiment, the beam 11, the projection member 14 and the weight 15 are formed integrally by micro-machining the silicon wafer 23. And the strain gauges 16a–16d are formed on the beam 11 directly as a diffusion resistor of the silicon. Therefore, the positions of the strain gauges 16a–16d are able to be determined very accurately. Therefore, the fifth embodiment is suitable for the mass-production manufacturing the detecting device with equalized detecting parameters.

Furthermore, the beam 11 is able to be thinned by etching in the fifth embodiment. Accordingly, the thickness of the beam 11 is able to be freely established according to the smallest level of the acceleration that should be detected.

The construction of the other elements of the fifth embodiment is the same as the fourth embodiment. Therefore, a further detailed explanation of the fifth embodiment is omitted.

Figure 13:
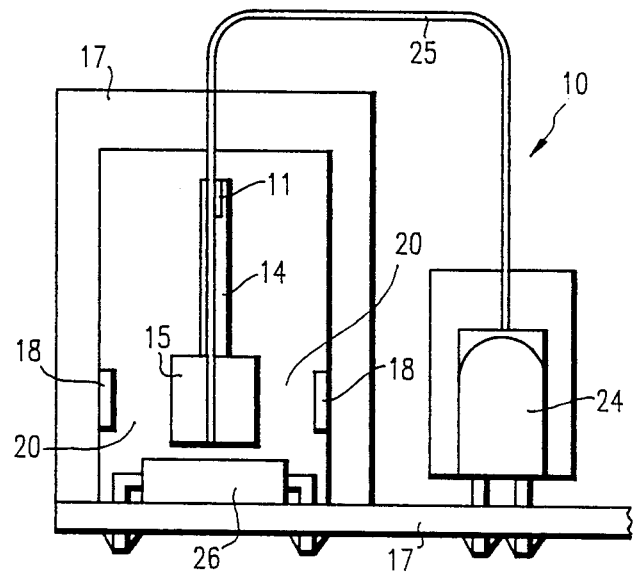
FIG. 13 cross sectional view along line I—I of FIG. 16 showing the sixth embodiment of the present invention.

Referring not to FIG. 13, the sixth embodiment of the present invention is explained. In the sixth embodiment, a light detecter comprising a LED (Light Emitting Diode) 24 and PSD (semiconductor Position Sensing Device) 26 is used as the means for detecting the amount of the twisting deformation of the beam 11 instead of the strain gauges 16a–16d of the fourth embodiment.

The LED 24 is disposed as a light source outside the case 17. The light generated by the LED 24 is transmitted to the PSD 26 by a light fiber 25. One end of the light fiber 25 is fixed to the LED 24, and the other end of the the light fiber 25 is fixed to the weight 15. The light generated by the LED 24 carried to the PSD 26 which is the element which converts the position of the incident light to an electric voltage or electric current.

In the sixth embodiment, when the beam 11 is twisted by applying the acceleration, the position of the incident light moves. At this stage, the electric voltage in proportion to the applied acceleration is output from the PSD 26.

The other construction of the other elements of the sixth embodiment is the same as the fourth embodiment. Therefore, a further detailed explanation of the sixth embodiment is omitted.

Figure 14:
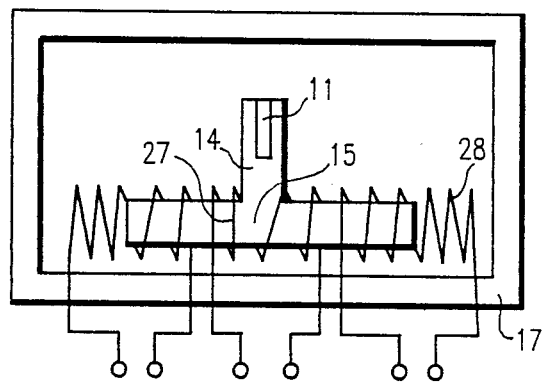
FIG. 14 cross sectional view along line II—II of FIG. 16 showing the sixth embodiment of the present invention.

Referring now to FIG. 14, the seventh embodiment is explained. In the seventh embodiment, one primary coil 27 and one pair of secondary coils 28 is used as the means for detecting the amount of the twisting deformation of the beam 11 instead of the strain gauges 16a–16d in the fourth embodiment.

The primary coil 27 is wound around the weight 15, and is excited by an A.C. voltage with a preferred frequency. Meanwhile, the two secondary coils 28 are wound near weight 15 facing both ends of the primary coil 27. The secondary coils 28 are fixed to the case 17 by means for fixing the coils (not shown). Preferred spaces are provided between the weight 15 and the secondary coils 28. Consequently, the weight 15 does not interfere with the secondary coils 28 when the weight 15 is displaced according to the deformation of the beam 11.

Figure 15:
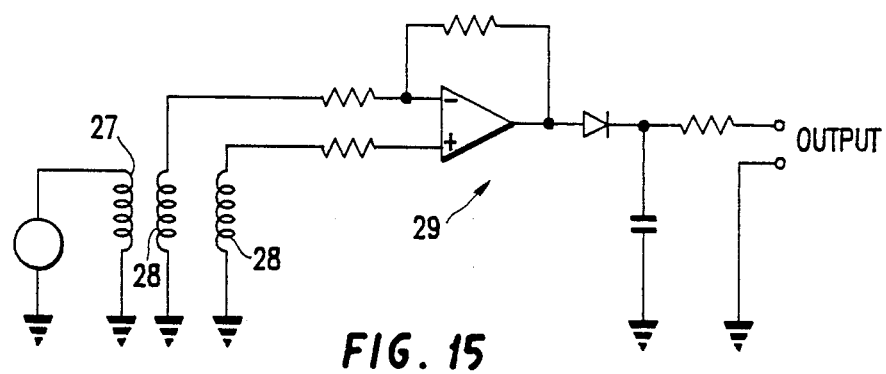
FIG. 15 is a circuit diagram showing the signal processing circuit for the sixth embodiment of the present invention.

In the seventh embodiment, when the beam 11 is twisting according to the applied acceleration, the induced voltages of the secondary coils 28 are changed by the variation of the mutual inductance between the primary coil 27 and secondary coils 28 in response to the amount of the twisting deformation of the beam 11. The two secondary coils 28 are connected to the signal processing circuit 29 shown in FIG. 15, and the voltage in proportion to the level of the acceleration is output from the signal processing circuit 29.

The construction of the other elements of the seventh embodiment is the same as the fourth embodiment. Therefore, a further detailed explanation of the seventh embodiment is omitted.

It is well known in the art that a required stress for twisting the beam 11 is established irrelevant to the total length of the beam 11. Therefore, the bending strength of the beam 11 is able to be strengthened by using the short beam 11 without reducing the detectable level of the acceleration.

Further, according to the present invention, the beam 11 is able to deform greatly and the weight 15 is projected from the beam 11. Therefore, the position of the stoppers 28 are able to be determined easily and roughly.

While there has been disclosed a preferred embodiment of the present invention, it will be understood by those skilled in the art that various rearrangements and modifications may be made therein without departing from the spirit and scope of the invention.

We claim:

1. An acceleration detecting device comprises a beam;
   means for supporting at least both ends of said beam;
   means for twisting said beam in response to an applied acceleration and substantially provided on the center of said beam; and,
   means for detecting amount of a twisting deformation of said beam, comprising means for converting said amount of twisting deformation to an electric signal including strain gauges; and means for processing said electric signal.

2. An acceleration detecting device according to claim 1, wherein two strain gauges are placed on said beam parallel to each other and at a 45° angle to the longitudinal direction of said beam.

3. An acceleration detecting device according to claim 2, wherein said strain gauges are placed on the opposite side of said beam from said means for twisting.

4. An acceleration detecting device according to claim 2, wherein said strain gauges are placed on the same side of said beam as said means for twisting.

5. An acceleration detecting device according to claim 1, wherein four strain gauges are located on said beam at ±45° to the longitudinal axis of said beam, a first pair of said strain gauges being parallel to each other, a second pair of said strain gauges being parallel to each other with the two pairs being perpendicular to each other.

6. An acceleration detecting device according to claim 5, wherein said strain gauges are located on the width surface of said beam which is perpendicular to said means for twisting.

7. An acceleration detecting device according to claim 6, wherein said beam and means for twisting are micromachined from a substrate.

8. An acceleration detecting device according to claim 1, wherein said means for processing said electric signal is a Wheatstone bridge.

* * * * *